(12) United States Patent
Yan et al.

(10) Patent No.: US 11,845,069 B2
(45) Date of Patent: Dec. 19, 2023

(54) CATALYST COMPOSITION, A PROCESS FOR PREPARING THE CATALYST COMPOSITION, AND A USE OF THE CATALYST COMPOSITION

(71) Applicant: YANGTZE UNIVERSITY, Jingzhou (CN)

(72) Inventors: XueMin Yan, Jingzhou (CN); PeiYue Wu, Jingzhou (CN); ZhaoFei Ma, Jingzhou (CN); Huan Yang, Jingzhou (CN); Hao Li, Jingzhou (CN); ZhongFu Cheng, Jingzhou (CN); Fei Deng, Jingzhou (CN)

(73) Assignee: YANGTZE UNIVERSITY, Jingzhou (CN)

(*) Notice: Subject to any disclaimer, the term of this patent is extended or adjusted under 35 U.S.C. 154(b) by 0 days.

(21) Appl. No.: 17/715,420

(22) Filed: Apr. 7, 2022

(65) Prior Publication Data

US 2022/0379291 A1  Dec. 1, 2022

Related U.S. Application Data

(63) Continuation of application No. PCT/CN2021/110009, filed on Aug. 2, 2021.

(30) Foreign Application Priority Data

May 27, 2021 (CN) .................. 202110587325.4

(51) Int. Cl.
*B01J 31/00* (2006.01)
*B01J 31/22* (2006.01)
(Continued)

(52) U.S. Cl.
CPC ....... *B01J 31/2273* (2013.01); *B01J 31/1815* (2013.01); *B01J 35/0013* (2013.01);
(Continued)

(58) Field of Classification Search
None
See application file for complete search history.

(56) References Cited

U.S. PATENT DOCUMENTS 3,785,975 A * 1/1974 Humphrey et al. ..... C10M 1/08
252/78.3

FOREIGN PATENT DOCUMENTS

CN       107456995 A   * 12/2017

* cited by examiner

*Primary Examiner* — Yun Qian
(74) *Attorney, Agent, or Firm* — WPAT, P.C.

(57) ABSTRACT

Disclosed is catalyst composition, a process for preparing the catalyst composition, and a use of the catalyst composition. The catalyst composition comprises 1 wt % to 4 wt % of free azacarbene, 1 wt % to 2 wt % of azacarbene iron, 15 wt % to 30 wt % of a phase transfer catalyst, 1 wt % to 5 wt % of a hydrogen donor, 5 wt % to 10 wt % of phosphoric acid, 0.5 wt % to 1 wt % of emulsifier, with the rest being solvent. This disclosure also provides a process for preparing the catalyst composition, comprising: mixing the free azacarbene and the azacarbene iron with the solvent according to a ratio, then adding and mixing the phase transfer catalyst and the hydrogen donor, then adding and mixing the phosphoric acid and the emulsifier to obtain the catalyst composition. The beneficial effect of this disclosure is: only less azacarbene iron and free azacarbene are needed to achieve rapid and efficient viscosity reduction of heavy oil.

4 Claims, 1 Drawing Sheet

(51) Int. Cl.
*B01J 31/18* (2006.01)
*B01J 35/00* (2006.01)
*B01J 37/04* (2006.01)

(52) U.S. Cl.
CPC ............ *B01J 37/04* (2013.01); *B01J 2231/64* (2013.01); *B01J 2531/842* (2013.01); *B01J 2531/90* (2013.01)

CATALYST COMPOSITION, A PROCESS FOR PREPARING THE CATALYST COMPOSITION, AND A USE OF THE CATALYST COMPOSITION

FIELD OF THE DISCLOSURE

The disclosure relates to the technical field of viscosity reduction of heavy oil production, in particular to catalyst composition, a process for preparing the catalyst composition, and a use of the catalyst composition.

BACKGROUND

Heavy oil has the characteristics of high viscosity, high freezing point, and poor fluidity in formation, which makes it difficult to be effectively recovered by conventional methods. At present, the heavy oil recovery technology mainly includes cold recovery technology, thermal recovery technology, and composite recovery technology combining cold recovery and thermal recovery. Among these mining technologies, thermal recovery technology based on steam injection is the most widely used.

In order to ensure the safety of the air injection production process and improve the economy of the oil recovery process, the research group of Southwest Petroleum University, China, proposed the low temperature catalytic oxidation oil recovery technology of air injection in heavy oil reservoir in 2002. This technology is to inject a suitable catalyst in the process of gas injection and recovery of heavy oil under reservoir condition to increase the low temperature oxidation rate of crude oil, thereby increasing oxygen consumption and releasing heat, and at the same time forming flue gas or nitrogen assisted external injection with high dryness steam to enhance the recovery of heavy oil, thereby effectively increasing the formation energy. The method is environmentally friendly, low in cost, and high in heat utilization.

However, the safety of heavy oil air injection low-temperature catalytic oxidation technology has always been the focus of academic circles, especially the safety of production wells. It must be ensured that when the air breaks through, the concentration of O2 in the produced gas is lower than the explosion safety threshold (5%). To this end, the current trend is to replace the oxidation source O2 with organic hydrogen peroxide compounds, H2O2, KIO4, NaIO4, etc., with or without adding a solvent, supplemented by a catalyst. However, the existing catalytic oxidation catalysts and viscosity reducers for the heavy oil production still have the problems that the catalytic viscosity reduction efficiency is low, and the content of heavy components in the reduced viscosity oil is still high.

At present, the commonly used catalysts for low-temperature catalytic oxidation of heavy oil by air injection, such as oil-soluble metal salt, nano-metal catalyst, and bifunctional catalyst, have problems with varying degrees of low catalytic effect, easy agglomeration, and high preparation cost. The key to solve this technical problem is to obtain suitable low temperature oxidation viscosity reducer.

SUMMARY

The purpose of this disclosure is to provide a catalyst composition, a process for preparing the catalyst composition, and a use of the catalyst composition, to solve the technical problem of high catalyst cost and poor viscosity reduction effect in the prior art.

In order to achieve the above-mentioned technical purposes, this disclosure provides a catalyst composition, a process for preparing the catalyst composition, and a use of the catalyst composition.

This disclosure provides a catalyst composition, comprising: 1 wt % to 4 wt % of free azacarbene, 1 wt % to 2 wt % of azacarbene iron, 15 wt % to 30 wt % of a phase transfer catalyst, 1 wt % to 5 wt % of a hydrogen donor, 5 wt % to 10 wt % of phosphoric acid, 0.5 wt % to 1 wt % of emulsifier, with the rest being solvent, and with the total being 100 wt %.

This disclosure also provides a process for preparing the catalyst composition, comprising: mixing the free azacarbene and the azacarbene iron with the solvent according to a ratio, then adding and mixing the phase transfer catalyst and the hydrogen donor, then adding and mixing the phosphoric acid and the emulsifier to obtain the catalyst composition.

This disclosure also provides a use of the catalyst composition in the treatment of heavy oil.

Compared with the prior art, the beneficial effect of the technical solution proposed by this disclosure is: The phase transfer catalyst can bring azacarbene iron into heavy oil to contact with oil, and the phosphoric acid can provide proton. The emulsifier promotes the heavy oil to form a water-in-oil structure, which is beneficial for viscosity reduction. In the process of viscosity reduction, heavy oil releases metal ions. The metal ions and the free azacarbene form a stable carbon-metal bond and obtain a stable complex. The complex chemically reacts with the azacarbene iron to reduce viscosity. While reducing viscous oil, metal ions released from heavy oil can be used to reduce viscosity. So only less azacarbene iron and free azacarbene are needed to achieve rapid and efficient viscosity reduction of heavy oil. After 6 h viscosity reduction treatment, the viscosity reduction rate of heavy oil can reach more than 90%.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Figure 1:
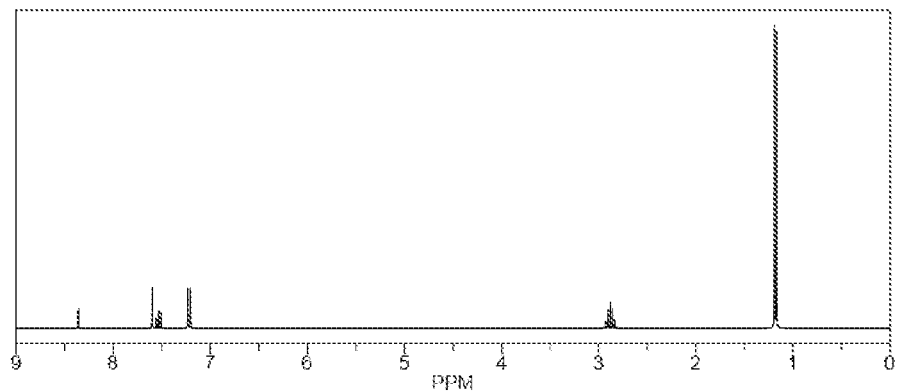
FIG. 1 is the hydrogen nuclear magnetic resonance spectrogram used for chemical structure identification of the free azacarbene of this disclosure.

The embodiment provides a catalyst composition, comprising: 1 wt % to 4 wt % of free azacarbene, 1 wt % to 2 wt % of azacarbene iron, 15 wt % to 30 wt % of a phase transfer catalyst, 1 wt % to 5 wt % of a hydrogen donor, 5 wt % to 10 wt % of phosphoric acid, 0.5 wt % to 1 wt % of emulsifier, with the rest being solvent, and with the total being 100 wt %, wherein the hydrogen donor is methanol, the solvent is benzene, the emulsifier is Span 80, the phase transfer catalyst is a quaternary ammonium salt; furthermore, the quaternary ammonium salt includes one or both of benzyltriethylammonium chloride and ammonium bromide.

In some embodiments, the catalyst composition also includes 5%-10% of styrene tar. The styrene tar is the rectification residue produced in the production process of ethylbenzene dehydrogenation to styrene, and its main components are styrene polymer, styrene, derivatives, etc. Styrene tar contains a large amount of mixed aromatic hydrocarbons and can be dissolved in heavy oil, which has a diluting effect on heavy oil, which is conducive to promoting the contact of azacarbene iron and free azacarbene with heavy oil, thereby promoting viscosity reduction.

The embodiment also provides a process for preparing the catalyst composition, comprising the following steps: mixing the free azacarbene and the azacarbene iron with the solvent according to a ratio, then adding and mixing the phase transfer catalyst and the hydrogen donor, then adding and mixing the phosphoric acid and the emulsifier to obtain the catalyst composition.

In some embodiments, the process also comprises adding and mixing the styrene tar before adding and mixing the phase transfer catalyst and the hydrogen donor.

The embodiment also provides a use of the catalyst composition in the treatment of heavy oil. Specifically, adding water to heavy oil according to the mass ratio of water and heavy oil (2-3):(7-8), and then, adding the catalyst composition to the heavy oil to reduce viscosity according to the addition amount of the catalyst composition being 0.5%-2.0% of the mass of the heavy oil.

The chemical structural of the free azacarbene in the embodiment is as follows:

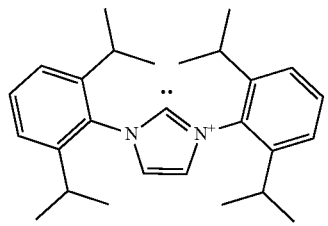

The chemical structural of the azacarbene iron in the embodiment is as follows:

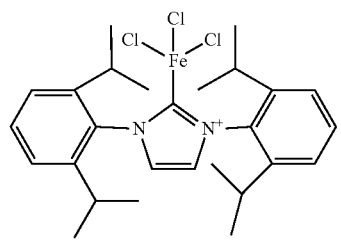

The free azacarbene in the embodiment is prepared by the following steps:

Reacting 2,6-diisopropylaniline with 40% glyoxal and formic acid in anhydrous ethanol for 2 days, then filtered and washed with cold methanol to obtain the diazabutadiene; wherein the molar ratio of the 2,6-diisopropylaniline to the glyoxal was 2:1. the yield of the diazabutadiene was 89.2%;

Stirring paraformaldehyde and HCl (4M in dioxane) at 30° C. for 12 h, then adding the mixture of diazetadiene and THF, and stirring at room temperature for 4 h, after filtration and washing, the 1,3-bis (2,6-diisopropyl-1-phenyl) imidazolium chloride was obtained; the molar ratio of the diazabutadiene, the paraformaldehyde, and the HCl is 1:1:1; the yield of 1,3-bis (2,6-diisopropyl-1-phenyl) imidazolium chloride was 88.4%;

Mixing 1,3-bis (2,6-diisopropyl-1-phenyl) imidazolium chloride and potassium tert-butoxide into the first organic solvent THF in a molar ratio of 1:1, and reacting at room temperature for 4 h, obtaining the free azacarbene by extraction with ethyl acetate, drying, and purification; the yield of free azacarbene was 66.7%; in FIG. 1, free azacarbene 1H-NMR (400 MHz, C6D6): d 1.13 (d,J=9.2 Hz, 12H, $CH(CH_3)_2$), 1.23 (d, J=9.2 Hz, 12H,$CH(CH_3)_2$), 2.91 (sep, J=9.2 Hz, 4H, $CH(CH_3)_2$),6.57 (s, 2H, NCH), 7.11 (m, 4H, m-$C_6H_3$), 7.22 (m, 2H, p-$C_6H_3$).

Figure 2:
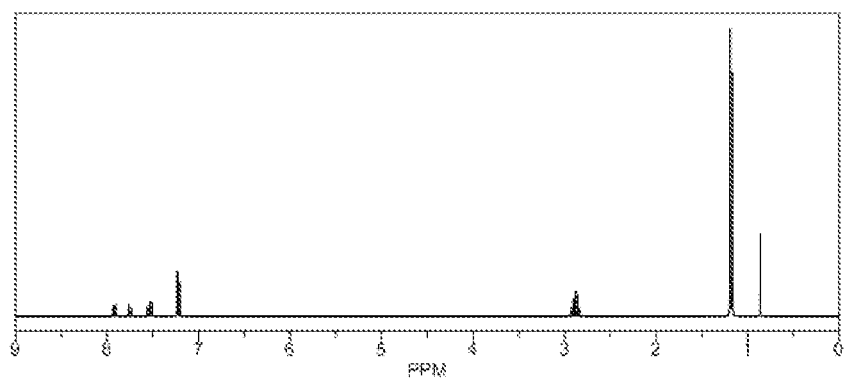
FIG. 2 is the hydrogen nuclear magnetic resonance spectrogram used for chemical structure identification of the azacarbene iron of this disclosure.

Furthermore, the azacarbene iron in this embodiment is prepared by the following steps:

Adding free azacarbene and anhydrous FeCl to the second organic solvent THF according to the molar ratio of 1:1, stirring at room temperature for 30 min, vacuum dried, filtered and washed with a mixture of toluene and pentane, and then recrystallized with the mixture of THF and pentane. The yield of azacarbene iron was 57.6%. In FIG. 2, the azacarbene iron [$FeCl_3(IPr)$]$^1$H NMR (C6D6): δ 8.55 (24H, $CH_3$), 1.51 (4H, =CH), 0.46 (8H, $CHMe_2$), -2.20 (8H, m-H), -2.89 (24H, $CH_3$), -3.68 (4H, p-H). $\mu_{eff}$ (Evans, $C_6D_6$): 7.4(1) Mb. $\mu_{eff}$(Evans, $C_6D_6$): 5.8(1) $\mu_B$. Anal. Calcd for $C_{27}H_{36}Cl_3FeN_2$: C, 58.88; H, 6.59; N, 5.09. Found: C, 57.54; H, 6.61; N, 4.67.

In the following embodiments, the catalyst compositions in Embodiment 1-Embodiment 4 were prepared according to the following steps:

Mixing the free azacarbene and the azacarbene iron with the solvent according to a ratio, then adding and mixing the phase transfer catalyst and the hydrogen donor, then adding and mixing the phosphoric acid and the emulsifier to obtain the catalyst composition.

The catalyst compositions in Embodiment 5-Embodiment 7 were prepared according to the following steps:

Mixing the free azacarbene and the azacarbene iron with the solvent according to a ratio, adding and mixing the styrene tar before adding and mixing the phase transfer catalyst and the hydrogen donor, then adding and mixing the phase transfer catalyst and the hydrogen donor, then adding and mixing the phosphoric acid and the emulsifier to obtain the catalyst composition.

Embodiment 1

Embodiment 1 provides a catalyst composition, comprising: 2 wt % of free azacarbene, 2 wt % of azacarbene iron, 20 wt % of phase transfer catalyst benzyltriethylammonium chloride, 3 wt % of a hydrogen donor methanol, 5 wt % of phosphoric acid, 0.6 wt % of emulsifier Span 80, with the rest being solvent benzene, and with the total being 100 wt %.

Embodiment 2

Embodiment 2 provides a catalyst composition, comprising: 1 wt % of free azacarbene, 2 wt % of azacarbene iron, 30 wt % of phase transfer catalyst bromide, 1 wt % of a hydrogen donor methanol, 8 wt % of phosphoric acid, 0.8 wt % of emulsifier Span 80, with the rest being solvent benzene, and with the total being 100 wt %.

Embodiment 3

Embodiment 3 provides a catalyst composition, comprising: 4 wt % of free azacarbene, 1 wt % of azacarbene iron, 15 wt % of phase transfer catalyst benzyltriethylammonium chloride, 5 wt % of a hydrogen donor methanol, 10 wt % of phosphoric acid, 1 wt % of emulsifier Span 80, with the rest being solvent benzene, and with the total being 100 wt %.

Embodiment 4

Embodiment 4 provides a catalyst composition, comprising: 3 wt % of free azacarbene, 2 wt % of azacarbene iron, 20 wt % of phase transfer catalyst bromide, 2 wt % of a hydrogen donor methanol, 8 wt % of phosphoric acid, 0.5 wt % of emulsifier Span 80, with the rest being solvent benzene, and with the total being 100 wt %.

Embodiment 5

Embodiment 5 provides a catalyst composition, comprising: 2 wt % of free azacarbene, 2 wt % of azacarbene iron, 20 wt % of phase transfer catalyst benzyltriethylammonium chloride, 3 wt % of a hydrogen donor methanol, 5 wt % of phosphoric acid, 0.6 wt % of emulsifier Span 80, 5 wt % of styrene tar, with the rest being solvent benzene, and with the total being 100 wt %.

Embodiment 6

Embodiment 6 provides a catalyst composition, comprising: 1 wt % of free azacarbene, 2 wt % of azacarbene iron, 30 wt % of phase transfer catalyst bromide, 1 wt % of a hydrogen donor methanol, 8 wt % of phosphoric acid, 0.8 wt % of emulsifier Span 80, 8 wt % of vinyl tar, with the rest being solvent benzene, and with the total being 100 wt %.

Embodiment 7

Embodiment 7 provides a catalyst composition, comprising: 4 wt % of free azacarbene, 1 wt % of azacarbene iron, 15 wt % of phase transfer catalyst benzyltriethylammonium chloride, 5 wt % of a hydrogen donor methanol, 10 wt % of phosphoric acid, 1 wt % of emulsifier Span 80, 10 wt % of vinyl tar, with the rest being solvent benzene, and with the total being 100 wt %.

Comparative Example 1

The difference between the catalyst composition provided in this Comparative example and Embodiment 1 is that it does not contain azacarbene iron. Specifically, in terms of mass percentage, it includes: 2 wt % of free azacarbene, 20 wt % of phase transfer catalyst benzyltriethylammonium chloride, 3 wt % of a hydrogen donor methanol, 5 wt % of phosphoric acid, 0.6 wt % of emulsifier Span 80, with the rest being solvent benzene, and with the total being 100 wt %.

Comparative Example 2

The difference between the catalyst composition provided in this Comparative example and Embodiment 1 is that it does not contain free azacarbene. Specifically, in terms of mass percentage, it includes: 2 wt % of azacarbene iron, 20 wt % of phase transfer catalyst benzyltriethylammonium chloride, 3 wt % of a hydrogen donor methanol, 5 wt % of phosphoric acid, 0.6 wt % of emulsifier Span 80, with the rest being solvent benzene, and with the total being 100 wt %.

Comparative Example 3

The difference between the catalyst composition provided in this Comparative example and Embodiment 1 is that it does not contain free azacarbene and azacarbene iron. Specifically, in terms of mass percentage, it includes: 20 wt % of phase transfer catalyst benzyltriethylammonium chloride, 3 wt % of a hydrogen donor methanol, 5 wt % of phosphoric acid, 0.6 wt % of emulsifier Span 80, with the rest being solvent benzene, and with the total being 100 wt %.

Comparative Example 4

The difference between the catalyst composition provided in this Comparative example and Embodiment 5 is that it does not contain free azacarbene and azacarbene iron. Specifically, in terms of mass percentage, it includes: 20 wt % of phase transfer catalyst benzyltriethylammonium chloride, 3 wt % of a hydrogen donor methanol, 5 wt % of phosphoric acid, 0.6 wt % of emulsifier Span 80, 5 wt % of styrene tar, with the rest being solvent benzene, and with the total being 100 wt %.

Application Example

The catalyst compositions provided in Embodiments 1-7 and in Comparative Examples 1-4 were used to treat heavy oil from Tuha city as reactants (viscosity 95650 mPa·s at 50° C.); specifically, the heavy oil and water were mixed according to the mass ratio of 7:3, and then the catalyst composition was added to the heavy oil according to the addition amount of 1.0% of the heavy oil mass, and the viscosity was reduced at 60° C. The viscosity reduction rates at 4 h, 6 h and 8 h were detected and obtained.

The viscosity of heavy oil was measured to evaluate the catalytic performance of the catalyst. The calculating formula of viscosity reduction rate is $\Delta\eta\ (\%) = ((\eta 0 - \eta)/\eta 0) \times 100\%$, $\eta 0$ and $\eta$ refers to the viscosity of oil sample before and after reaction, respectively, in mPa·s; the viscosity reduction results are shown in Table 1.

TABLE 1

Results of viscosity reduction of heavy oil of Embodiments 1-7 and Comparative Examples 1-4 at different time

| Viscosity Reducer | 4 h Viscosity reduction rate (%) | 6 h Viscosity reduction rate (%) | 8 h Viscosity reduction rate (%) | 8 h Proportion of heavy components decomposed into light components (%) |
|---|---|---|---|---|
| Embodiment 1 | 50.4 | 79.5 | 90.8 | 72.4 |
| Embodiment 2 | 49.8 | 78.6 | 89.9 | 76.8 |
| Embodiment 3 | 51.2 | 80.2 | 92.7 | 77.6 |
| Embodiment 4 | 52.7 | 79.7 | 91.4 | 74.3 |
| Embodiment 5 | 72.5 | 90.1 | 91.6 | 75.4 |
| Embodiment 6 | 70.4 | 89.4 | 90.4 | 74.8 |
| Embodiment 7 | 71.3 | 90.7 | 91.1 | 76.2 |
| Comparative Example 1 | 12.4 | 30.5 | 48.8 | 5.2 |
| Comparative Example 2 | 18.8 | 38.7 | 52.9 | 6.8 |
| Comparative Example 3 | 5.7 | 7.2 | 9.7 | 1.1 |
| Comparative Example 4 | 7.9 | 8.4 | 10.6 | 1.3 |

It can be seen from Table 1 that the viscosity reduction rate of Embodiments 1-4 is as high as about 90% after 8 h of viscosity reduction, and Embodiments 5-7 have improved the fluidity of heavy oil due to the addition of ethylene tar, and significantly accelerated the viscosity reduction rate, so it only takes 6 hours for the viscosity reduction rate to reach as high as about 90%; while the viscosity reduction rate of Comparative Examples 1-2 is very low, which may be because the content of azacarbene iron or free azacarbene in the comparative example is low, and a small amount of azacarbene iron and free azacarbene alone are not conducive to viscosity reduction. In addition, the proportion of heavy components decomposed into light components in Embodiments 1-7 is as high as more than 70%, which is significantly higher than that in Comparative Examples 1-4. Comparative Examples 1-4 further illustrate that the viscosity reduction effect of the catalyst composition proposed by this disclosure is achieved by the coordination of various components.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A catalyst composition, comprising: 1 wt % to 4 wt % of free azacarbene, 1 wt % to 2 wt % of azacarbene iron, 15 wt % to 30 wt % of a phase transfer catalyst, 1 wt % to 5 wt % of a hydrogen donor, 5 wt % to 10 wt % of phosphoric acid, 0.5 wt % to 1 wt % of emulsifier, with the rest being solvent, and with the total being 100 wt %;

wherein the chemical structural of the free azacarbene in the embodiment is as follows:

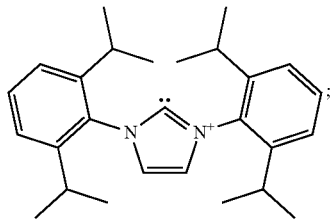

wherein the chemical structural of the azacarbene iron is as follows:

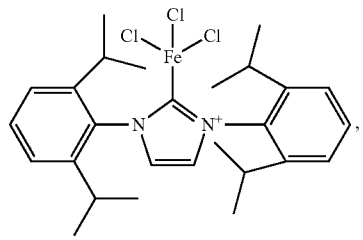

wherein the phase transfer catalyst is a quaternary ammonium salt;

wherein the hydrogen donor is methanol;

wherein the emulsifier is Span 80;

wherein the solvent is benzene.

2. The catalyst composition according to claim 1, wherein the quaternary ammonium salt includes one or both of benzyltriethylammonium chloride and ammonium bromide.

3. A catalyst composition, consisting of: 1 wt % to 4 wt % of free azacarbene, 1 wt % to 2 wt % of azacarbene iron, 15 wt % to 30 wt % of a phase transfer catalyst, 1 wt % to 5 wt % of a hydrogen donor, 5 wt % to 10 wt % of phosphoric acid, 0.5 wt % to 1 wt % of emulsifier, with the rest being solvent, 5%-10% of styrene tar, and with the total being 100 wt %;

wherein the chemical structural of the free azacarbene in the embodiment is as follows:

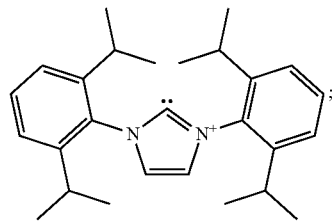

wherein the chemical structural of the azacarbene iron is as follows:

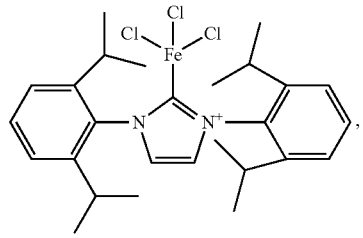

wherein the phase transfer catalyst is a quaternary ammonium salt;

wherein the hydrogen donor is methanol;

wherein the emulsifier is Span 80;

wherein the solvent is benzene.

4. The catalyst composition according to claim 3, wherein the quaternary ammonium salt includes one or both of benzyltriethylammonium chloride and ammonium bromide.

* * * * *